(12) United States Patent
Clark et al.

(10) Patent No.: US 10,794,532 B1
(45) Date of Patent: Oct. 6, 2020

(54) HYDRAULIC TRIPOD

(71) Applicants: David Clark, Clark, CO (US); Nathan Kanner, Denver, CO (US); Thomas Cassaro, Minas Gerais (BR)

(72) Inventors: David Clark, Clark, CO (US); Nathan Kanner, Denver, CO (US); Thomas Cassaro, Minas Gerais (BR)

(73) Assignee: Colorado Tripod Company, LLC, Lakewood, CO (US)

( * ) Notice: Subject to any disclaimer, the term of this patent is extended or adjusted under 35 U.S.C. 154(b) by 0 days.

(21) Appl. No.: 16/504,270

(22) Filed: Jul. 7, 2019

(51) Int. Cl.
*F16M 11/36* (2006.01)
*G03B 17/56* (2006.01)

(52) U.S. Cl.
CPC .......... *F16M 11/36* (2013.01); *G03B 17/561* (2013.01); *F16M 2200/025* (2013.01); *F16M 2200/065* (2013.01)

(58) Field of Classification Search
CPC ............. F16M 11/36; F16M 2200/065; F16M 2200/025; G03B 17/561
USPC ................... 248/163.1, 168, 170, 173, 188.5
See application file for complete search history.

(56) References Cited

U.S. PATENT DOCUMENTS

| | | | | |
|---|---|---|---|---|
| 2,260,241 A | * | 10/1941 | Bargen | A47C 3/26 248/407 |
| 2,661,672 A | * | 12/1953 | Fairbanks | F16M 11/42 396/428 |
| 3,941,492 A | * | 3/1976 | Meinunger | F16B 7/1409 403/104 |
| 4,324,477 A | * | 4/1982 | Miyazaki | F16M 11/08 248/163.1 |
| 4,932,622 A | * | 6/1990 | Hayakawa | F16B 7/1454 248/188.5 |
| 6,259,373 B1 | * | 7/2001 | Ghahramani | B60Q 7/00 340/815.4 |
| 6,322,027 B1 | * | 11/2001 | Hsu | F16M 11/34 248/177.1 |
| 6,820,844 B2 | * | 11/2004 | Tiffen | F16M 11/32 248/168 |
| 6,854,697 B2 | * | 2/2005 | Akaike | F16M 11/32 248/161 |

(Continued)

*Primary Examiner* — Muhammad Ijaz
(74) *Attorney, Agent, or Firm* — Christopher Pilling; Johan Eide My Patent Guys

(57) ABSTRACT

The present invention relates to a hydraulic tripod wherein at least one leg section of at least one leg of the tripod is deployed by hydraulic means in a predetermined sequence. The present invention may also relate to a stabilization platform having at least one hydraulic leg. The hydraulic tripod provides a semi-automated solution for the deployment of at least one leg of a tripod. The semi-automated deployment allows the user a hands-free experience and allows for correct positioning of the head member from the start of assembly with no further iterative adjustment. During use the user manually engages a handle and an input device adjoined to a head member of the hydraulic tripod. As a result of the manual engagement of the input device, a characteristic of a hydraulic cylinder is altered resulting in the initiation, stopping or manipulation of the deployment of the at least one leg section. The hydraulic tripod provides an advantage of the tripods of the prior art for various articles, in particular guns and video cameras, due to the invention's light weight and ease of operation.

17 Claims, 18 Drawing Sheets

(56) References Cited

U.S. PATENT DOCUMENTS

| | | | | |
|---|---|---|---|---|
| 6,902,294 B2* | 6/2005 | Wright | ............... | F21V 21/06 |
| | | | | 362/191 |
| 9,163,774 B2* | 10/2015 | Orlov | ............... | F16M 11/2078 |
| 10,514,278 B1* | 12/2019 | Becker | ............... | G01D 11/30 |
| 2003/0226941 A1* | 12/2003 | Crain | ............... | F16M 13/00 |
| | | | | 248/166 |
| 2008/0111036 A1* | 5/2008 | Cartoni | ............... | G03B 17/561 |
| | | | | 248/188.5 |
| 2008/0310834 A1* | 12/2008 | Chatman, II | ............... | F16M 13/00 |
| | | | | 396/419 |
| 2010/0019107 A1* | 1/2010 | McCloud | ............... | A61M 16/0875 |
| | | | | 248/83 |
| 2010/0155549 A1* | 6/2010 | Robinson | ............... | F16M 13/00 |
| | | | | 248/183.1 |
| 2010/0224745 A1* | 9/2010 | Orlov | ............... | F16M 11/14 |
| | | | | 248/188.3 |
| 2011/0215206 A1* | 9/2011 | Conrad | ............... | H01Q 1/12 |
| | | | | 248/121 |
| 2011/0296908 A1* | 12/2011 | Kjerstad | ............... | G01V 3/15 |
| | | | | 73/170.29 |
| 2013/0299760 A1* | 11/2013 | Spinazze | ............... | B66F 5/04 |
| | | | | 254/93 R |
| 2014/0301730 A1* | 10/2014 | Johnson | ............... | G03B 17/561 |
| | | | | 396/428 |
| 2015/0338017 A1* | 11/2015 | De Faveri | ............... | F16M 11/16 |
| | | | | 396/428 |
| 2015/0346589 A1* | 12/2015 | Dering | ............... | G03B 17/561 |
| | | | | 396/428 |
| 2016/0061377 A1* | 3/2016 | Nakatani | ............... | F16M 11/045 |
| | | | | 248/184.1 |
| 2019/0186459 A1* | 6/2019 | Skjoldhammer | ............... | F03B 13/187 |

* cited by examiner

HYDRAULIC TRIPOD

BACKGROUND OF THE INVENTION

1. Field of the Invention

The present invention relates to a hydraulic tripod for use in stabilizing an article.

2. Description of Related Art

It common to use of many different articles of manufacture in multiple locations, such as cameras, guns, and surveying equipment, all requiring stabilization and mounting in changing environments. With an article of manufacture, such as a camera, the user of the camera often totes a tripod or a modular mount during travel. Tripods and other modular mounts often include a means of manual adjustment for adjusting the width of the tripod or the height of the tripod. Further manual adjustment commonly facilitates a change in angle, pitch, yaw, or roll of a mount adjoined to the tripod. During the adjustment process, the user is required to adjust the tripod to match the desired camera angle, the topography of the ground on which the tripod rests, or different cameras. This adjustment process often requires multiple iterative interactions and a lengthy amount of time to properly position a camera upon a tripod. Other articles of manufacturer have similar known struggles when aligned upon a tripod.

Furthermore, common available manual means of adjusting a leg of a tripod are often sensitive and are easily overtightened or not secured enough. This directly results in movement of the article of manufacturer resting upon the tripod during use and requires re-assembly by the user. For example, the user of a traditional tripod may loosen one respective leg, only to discover that another leg of the tripod has collapsed and alignment of all legs needs to be redone.

A solution is needed for reducing the number of revisions required to properly assemble a tripod and to reduce the total amount of time required during assembly of a tripod.

BRIEF SUMMARY OF THE INVENTION

The following presents a simplified summary of some embodiments of the invention in order to provide a basic understanding of the invention. This summary is not an extensive overview of the invention. It is not intended to identify key/critical elements of the invention or to delineate the scope of the invention. Its sole purpose is to present some embodiments of the invention in a simplified form as a prelude to the more detailed description that is presented later.

The present invention relates to a hydraulic tripod wherein at least one leg section of at least one leg of the tripod is deployed by hydraulic means in a predetermined sequence. The present invention may also relate to a stabilization platform having at least one hydraulic leg. The present invention solves the problems presented above by providing a semi-automated solution for the deployment of at least one leg of a tripod. The semi-automated deployment allows the user a hands-free experience enabling correct positioning of the head member from the start of assembly with no further iterative adjustment. During exemplary use, the user manually engages a handle and an input device adjoined to a head member of the hydraulic tripod. The at least one leg is hingedly adjoined to the head member. During manual engagement of the input device, a characteristic of a hydraulic cylinder is altered resulting in the initiation, stopping, or manipulation of the deployment of the at least one leg section.

Another object of the present invention is to provide a tripod that is quickly moved to another location having different topography with minimal effort. For example, a user may assemble the hydraulic tripod in a first position, decide to move to a second position, lift the hydraulic tripod off the ground, and while holding down the input device re-position the hydraulic tripod as desired in the second location.

Another object of the present invention is to streamline adjustment while the hydraulic tripod remains in a first position. For example, after initially engaging the input device to deploy at least one leg, the user may further re-engage the input device to re-adjust the location of the head member further.

In order to do so, a hydraulic tripod is provided having a head member having an article attachment member to hold an article, such as a camera. Next, at least one hydraulic cylinder and an input device is adjoined to the head member. The input device being in fluid connection with the at least one hydraulic cylinder. In one embodiment, at least one leg section is arranged within at least one leg, wherein the at least one leg includes a central leg axis and the at least one section includes a central leg section axis. In one embodiment, the central leg section axis is offset from the central leg axis, wherein the offset forms a hose channel existing between an internal surface each of the at least one legs and an external surface of the at least one leg section. In one embodiment, at least one slave cartridge is positioned within the at least one leg, wherein the at least one slave cartridge includes at least one piston port in fluid connection with at least one cylinder port of the hydraulic cylinder. In one embodiment, the hose channel is designed is allow for a hose adjoined to the at least one cylinder port and the at least one piston port to pass freely back to the hydraulic cylinder, as well as to other slave cartridges arranged in series. In one embodiment, the at least one slave cartridge can act directly or in conjunction with a lever to move at least one brake pad against or away from the at least one leg section of the hydraulic tripod. Consequently, the at least one leg section is allowed to freely translate within the at least one leg of the hydraulic tripod while the at least one brake pad is not contacting with at least one leg section.

BRIEF DESCRIPTION OF THE SEVERAL VIEWS OF THE DRAWINGS

The detailed description of some embodiments of the invention is made below with reference to the accompanying figures, wherein like numerals represent corresponding parts of the figures. The novel features of the disclosure are set forth with particularity in the appended claims. A better understanding of the features and advantages of the present disclosure will be obtained by reference to the following detailed description that sets forth illustrative embodiments, in which the principles of the disclosure are utilized, and the accompanying drawings of which:

DETAILED DESCRIPTION OF THE INVENTION

Figure 1:
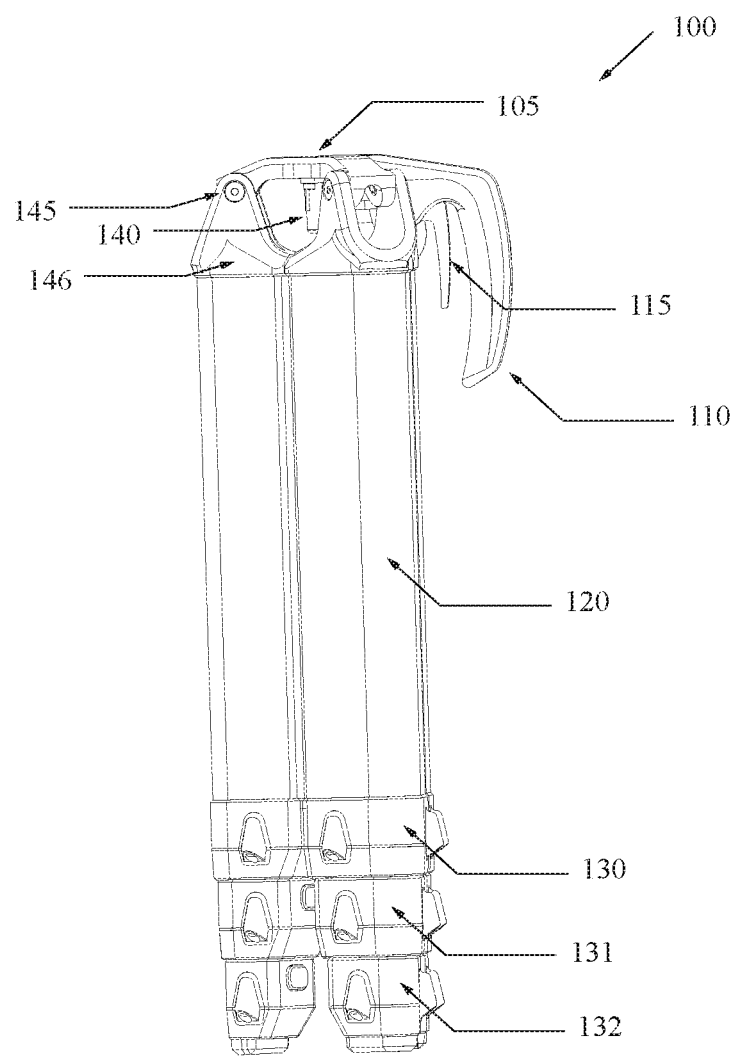
FIG. 1 shows an exemplary perspective view of one embodiment of the hydraulic tripod.
Figure 2:
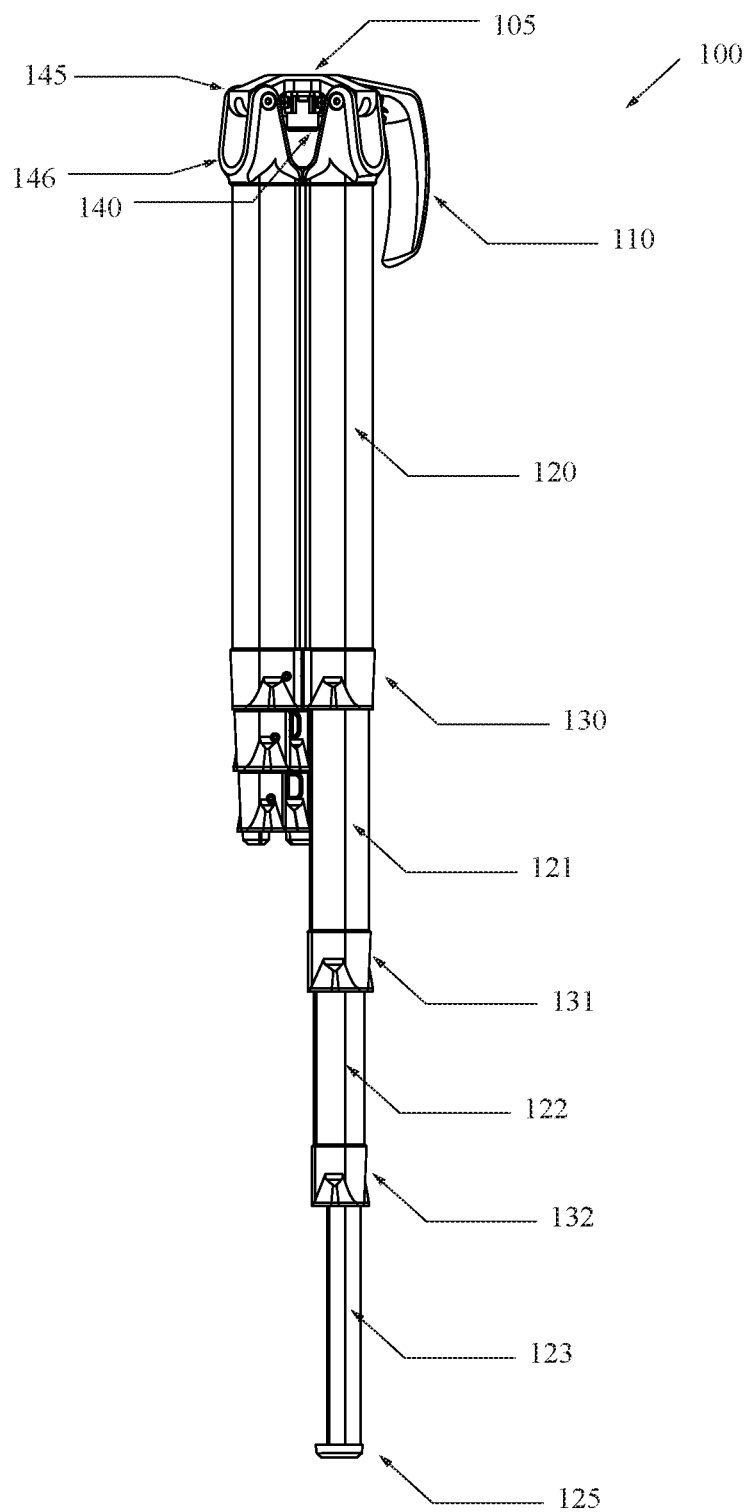
FIG. 2 shows an exemplary perspective view of one embodiment of the hydraulic tripod.
Figure 3:
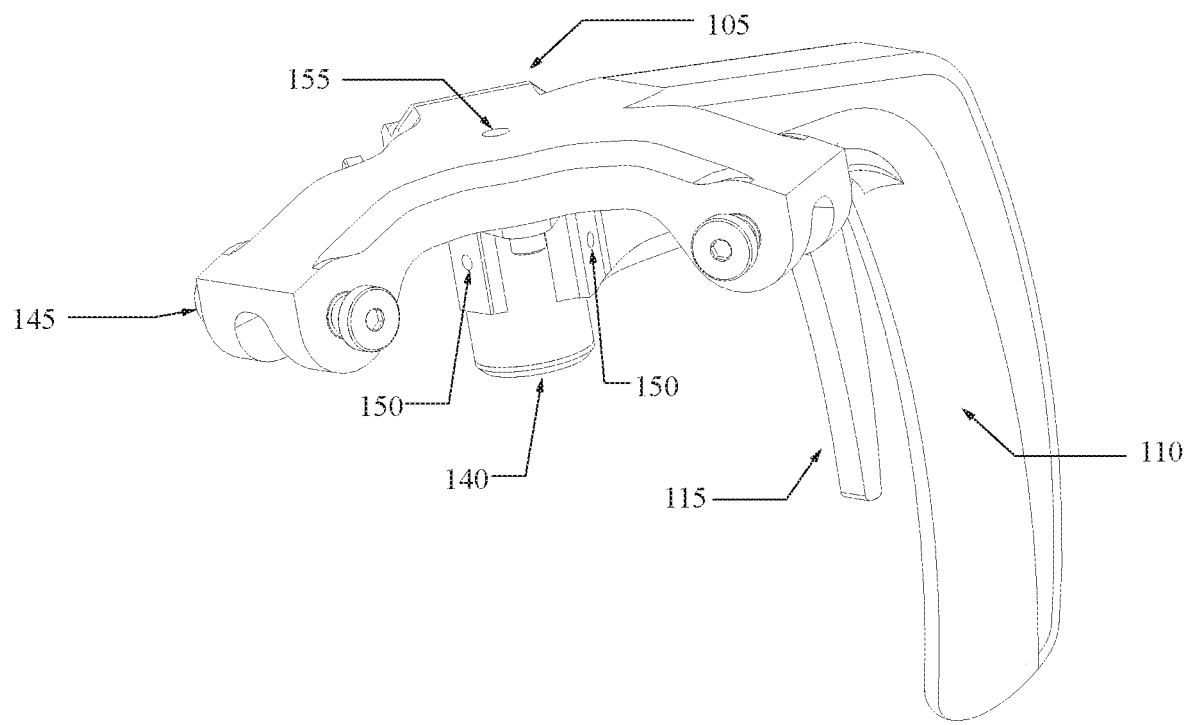
FIG. 3 shows an exemplary perspective view of one embodiment of the head member 105 of the hydraulic tripod.
Figure 4:
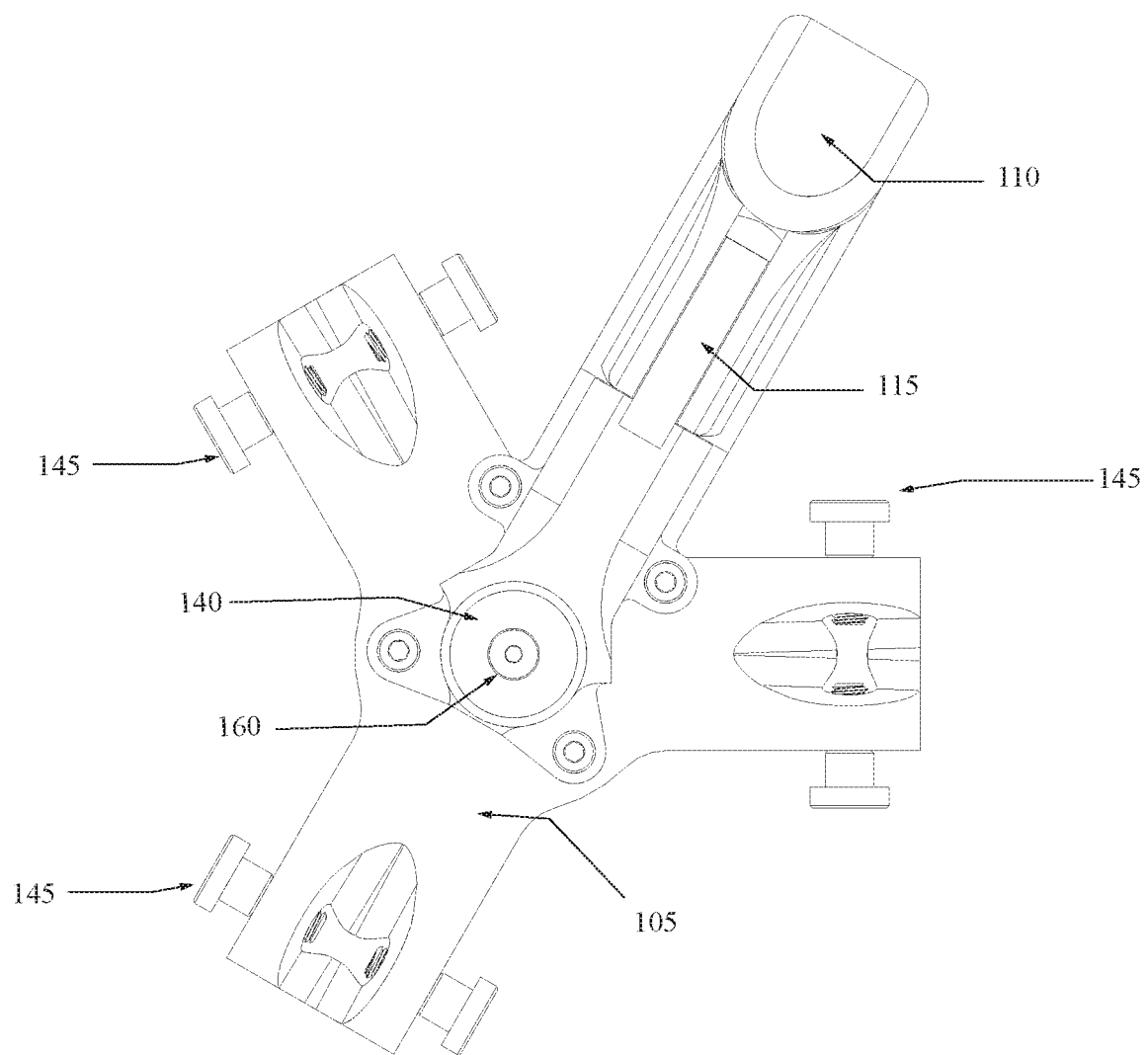
FIG. 4 shows an exemplary bottom view of one embodiment of the head member 105 of the hydraulic tripod.

While preferred embodiments of the present disclosure have been shown and described herein, it will be obvious to those skilled in the art that such embodiments are provided by way of example only. Numerous variations, changes, and substitutions will now occur to those skilled in the art without departing from the disclosure. It should be understood that various alternatives to the embodiments of the disclosure described herein may be employed in practicing the disclosure.

FIGS. 1-6 illustrate a hydraulic tripod 100 for stabilization of an article, including but not limited to guns, video cameras, and photography equipment. The top of the hydraulic tripod 100 comprising a head member 105 having an article attachment member 155. In one embodiment, adjoined to the head member 105 is at least one hydraulic cylinder 140. The at least one hydraulic cylinder 140 has an internal volume and at least one cylinder port 150 extending through the at least one hydraulic cylinder 140. The at least one cylinder port 150 allows access to the internal volume of the at least one hydraulic cylinder 140 to hydraulically manipulate other components of the hydraulic tripod 100. In one embodiment, to manipulate the at least one hydraulic cylinder 140, an input device 115 is adjoined to the head member 105 and is in fluid connection or mechanical connection with the at least one hydraulic cylinder 140. In some embodiments, a handle 110 is further adjoined to the head member 105 for aiding a user in manually engaging the input device 115. In other embodiments, the at least one hydraulic cylinder 140 can include at least one access port 160 allowing for maintenance of the internal volume or the filling of the internal volume with a hydraulic fluid.

Figure 5:
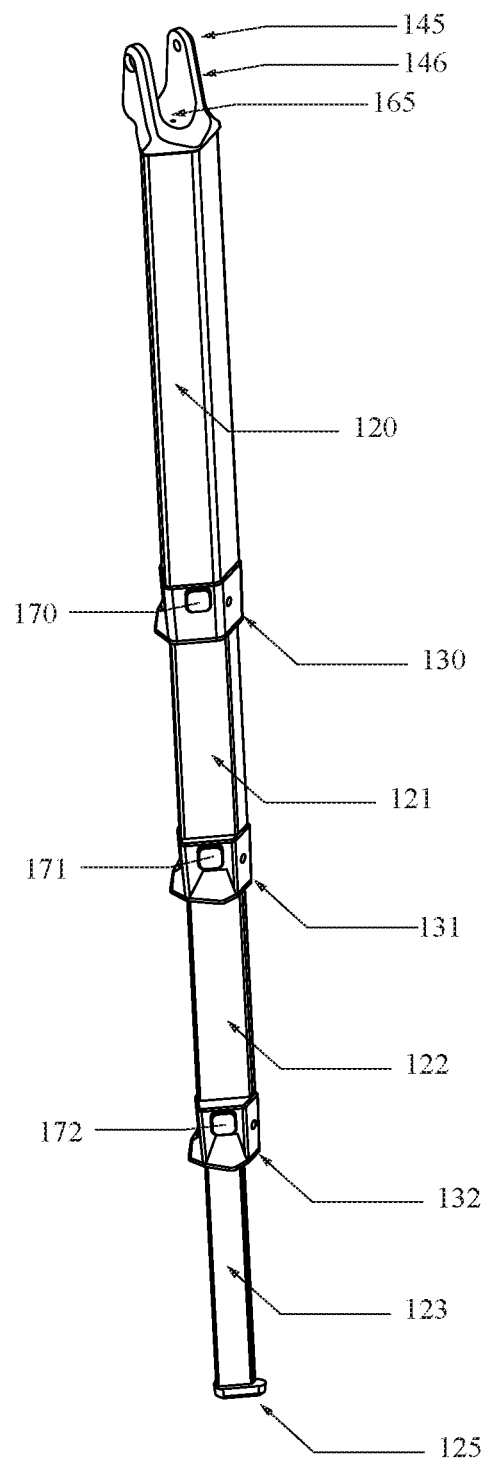
FIG. 5 shows an exemplary perspective view of one embodiment of a leg of the hydraulic tripod.
Figure 6:
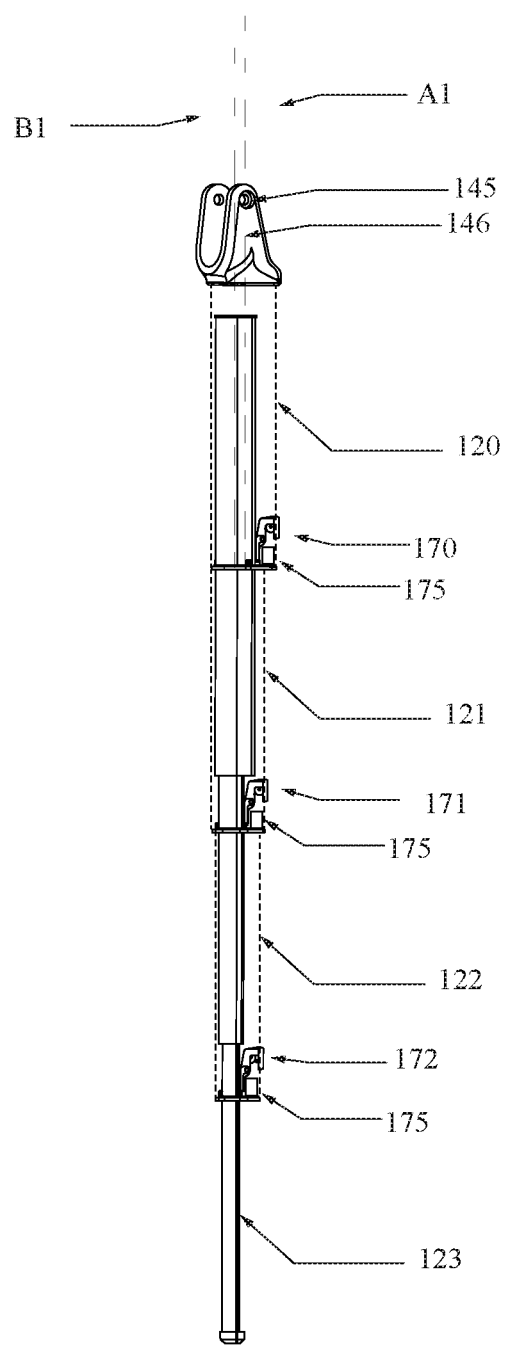
FIG. 6 shows an exemplary perspective view of one embodiment of a leg of the hydraulic tripod with selected sections hidden from view.
Figure 7:
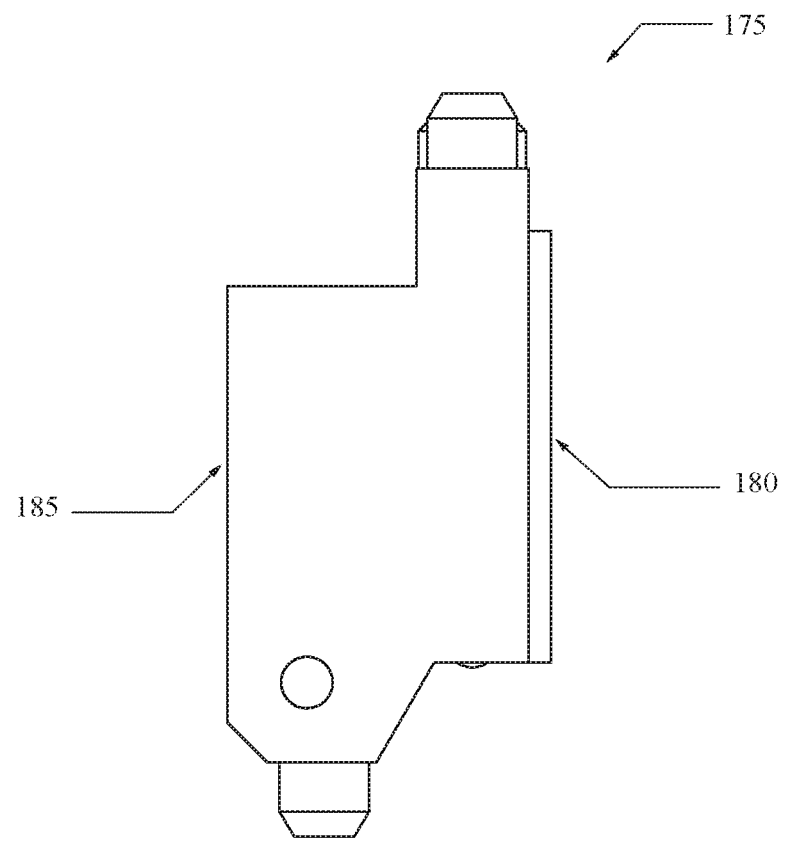
FIG. 7 shows an exemplary left view of one embodiment of a slave cartridge of the hydraulic tripod.
Figure 8:
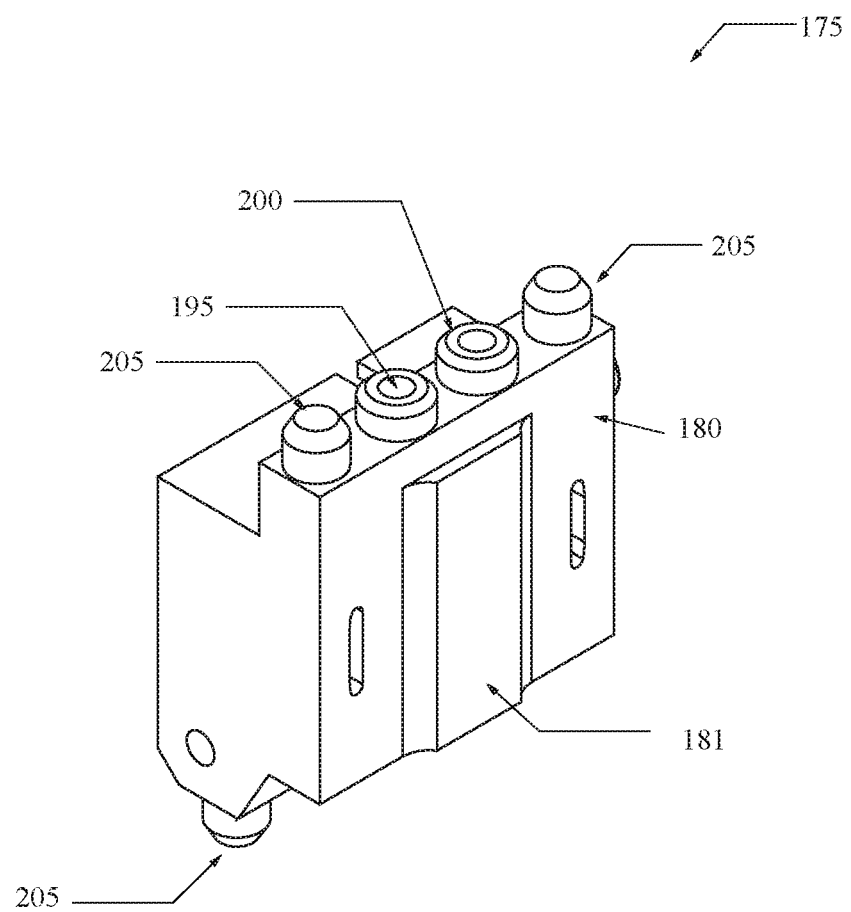
FIG. 8 shows an exemplary perspective view of one embodiment of a slave cartridge of the hydraulic tripod.
Figure 9:
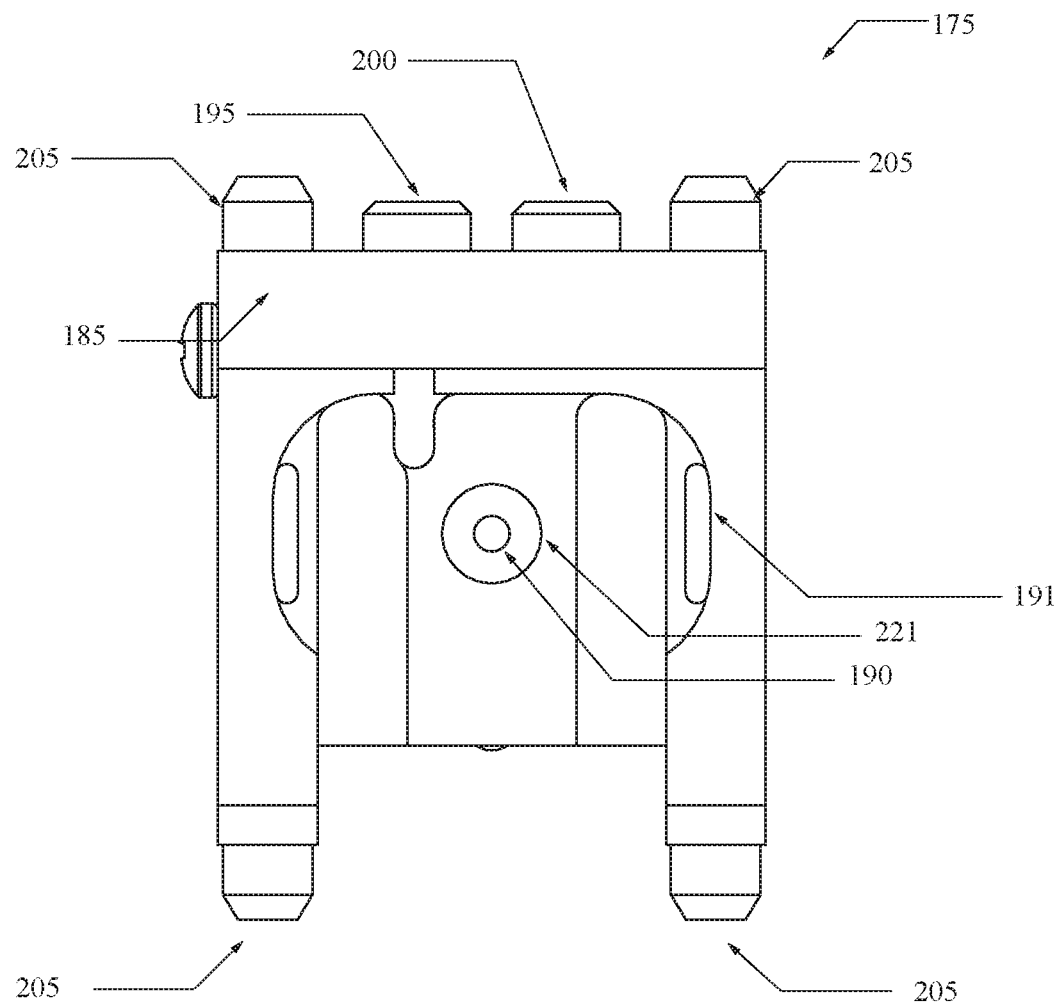
FIG. 9 shows an exemplary rear view of one embodiment of a slave cartridge of the hydraulic tripod.
Figure 10:
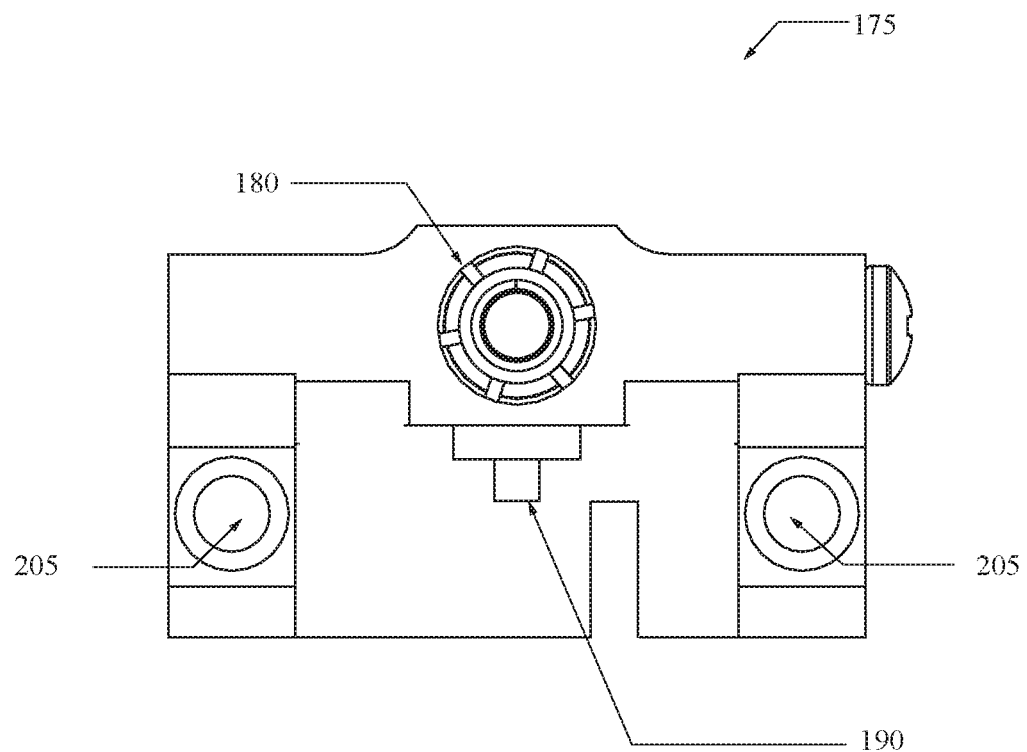
FIG. 10 shows an exemplary bottom view of one embodiment of a slave cartridge of the hydraulic tripod.
Figure 11:
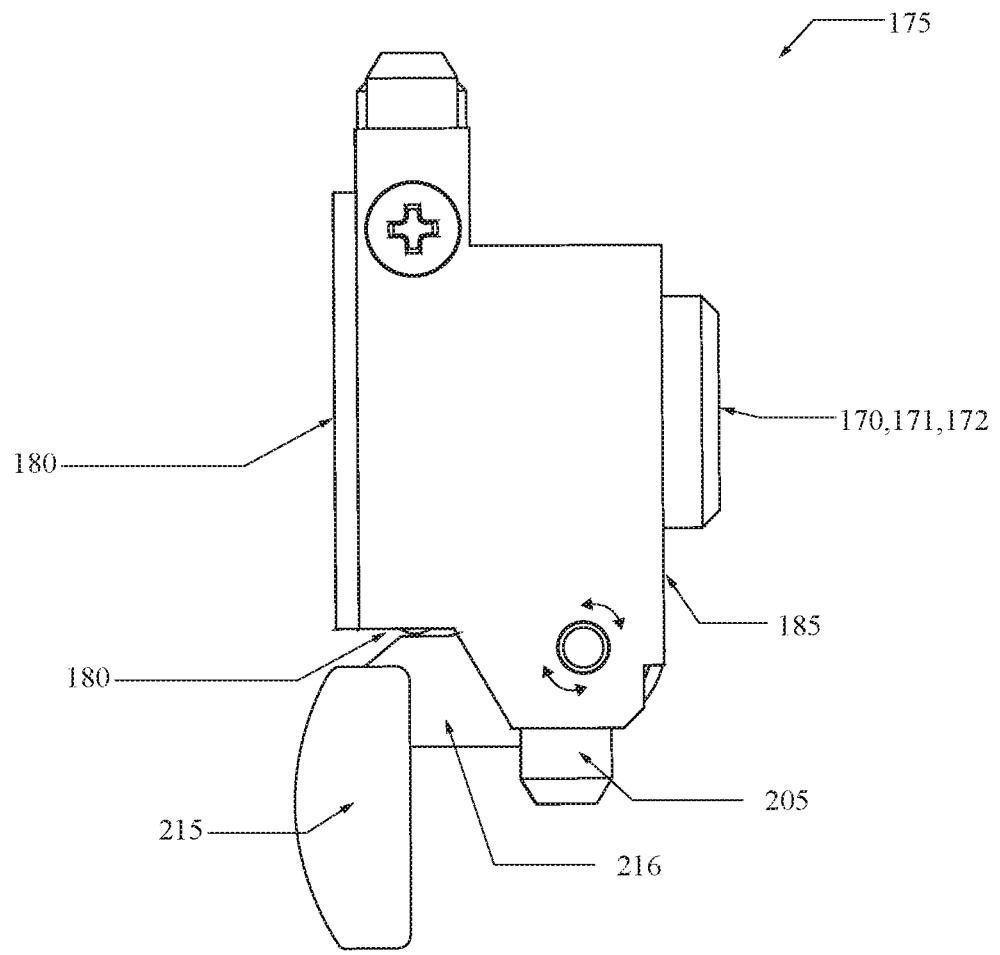
FIG. 11 shows an exemplary right view of one embodiment of a slave cartridge of the hydraulic tripod.
Figure 12:
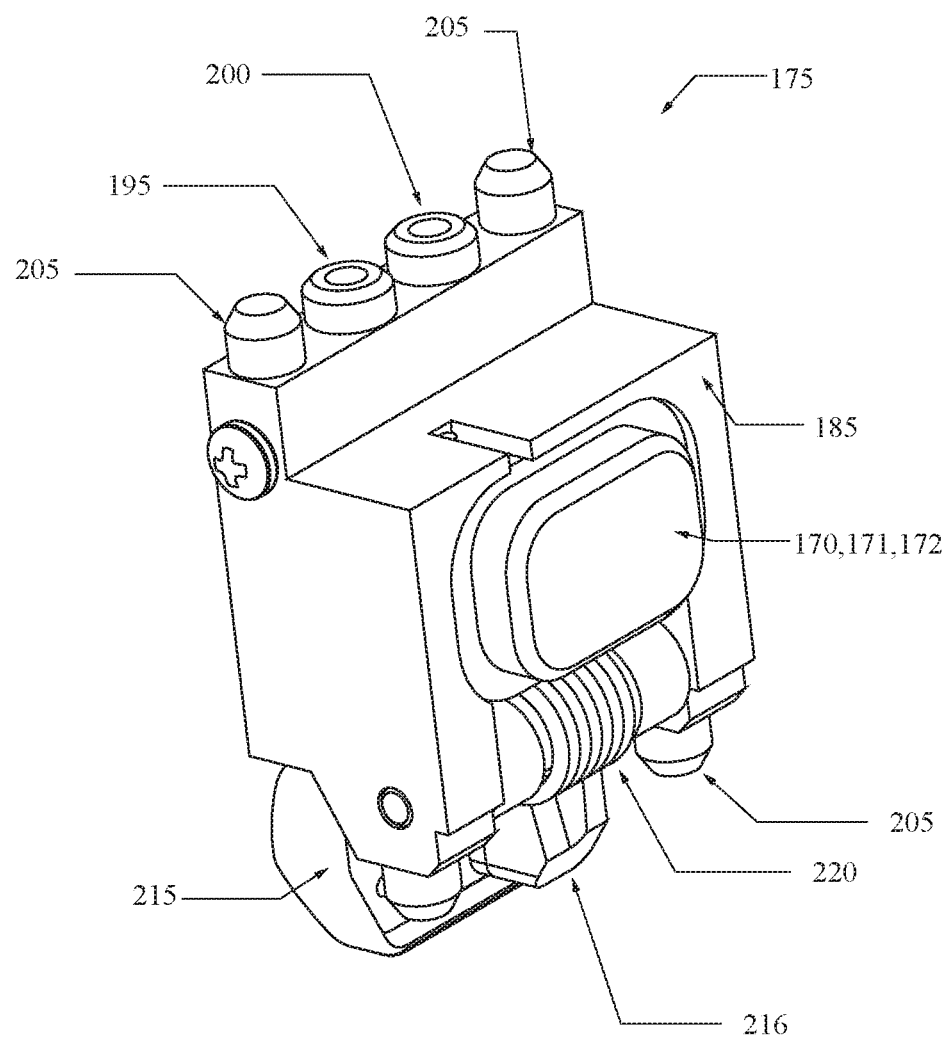
FIG. 12 shows an exemplary perspective view of one embodiment of a slave cartridge of the hydraulic tripod.

In one embodiment, below the head member 105, the hydraulic tripod 100 includes at least one leg 120 having a leg proximal end, a leg distal end, and a central leg axis A1 extending a length of each leg of the at least one leg 120. In one embodiment, the at least one leg 120 is hingedly adjoined to the head member 105 at the leg proximal end. In some embodiments, the leg proximal end of the at least one leg 120 includes a leg bracket 146. In some embodiments, the leg bracket 146 includes a hinged connection member 145 and a bracket port 165 protruding through the bracket. In one embodiment, the head member 105 and the leg bracket 146 are adjoined by the hinged connection member 145. In one embodiment, as shown in FIGS. 5 and 6, at least one leg section 121 includes a first leg section 121, a second leg section 122, and a third leg section 123. Each leg section 121,122, and 123 includes a section proximal end, a section distal end, and a central leg section axis B1 extending a length of each leg section 121,122 and 123. In other embodiments, the hydraulic tripod 100 may comprise a plurality of leg sections. It is critical to the operation of the hydraulic tripod 100 that the central leg section axis B1 is offset from the central leg axis A1, as shown in FIG. 6, thereby creating a hose channel 174. A hose 280 is then routed within the hose channel 174 and facilitates a fluid connection between the input device 115, the at least one hydraulic cylinder 140, and at least one slave cartridges 175.

Next, for manual engagement by the user, the input device 115 is rotationally or slidably adjoined to the handle 110 of the head member 105. During manual engagement of the input device 115, a characteristic of the at least one hydraulic cylinder 140 is manipulated and consequentially the pressure within the hose is manipulated causing a shaft 180 of the at least one slave cartridge 175 to engage a lever 216.

In some embodiments, the input device 115 is at least one member of an input set consisting of: a lever 216, a trigger, a mechanical pump, a servo, a rotational adjustment knob, an electrical pump, a motor, and a foot pedal. The characteristic of the at least one hydraulic cylinder 140 includes at least one member of a characteristic set consisting of: a pressure of the internal volume, a directional flow of the at least one cylinder port 150, and a flow rate of the at least one cylinder port 150. During use, the user may manually engage the input device 115 to pressurize the at least one hydraulic cylinder 140. In a second exemplary use, the user may manually engage the input device 115 to switch the directional flow of the at least one hydraulic cylinder 140, the at least one slave cartridge 175, or the hose 280.

In some embodiments, at least one brake pad 215 is adjoined to the lever 216 such that during the engagement of the lever 216 by the shaft 180, the at least one brake pad 215 is moved away from each external surface of the leg sections 121,122 and 123 simultaneously. In some embodiments, the engagement of the at least one slave cartridge 175 to move the at least one brake pad 215 is not conducting simultaneously, rather the engagement is done sequentially or selectively. For example, at least one lever spring 220 is configured to drive the order of the engagement of the at least one slave cartridges 175. Based on the configuration of the at least one lever spring 220, the leg section 121,122, and 123 of the at least one leg 120 are sequentially released. During release, the at least one brake pad 215 is moved when a predetermined spring force of the at least one lever spring 220 is overcome by the moment induced upon the lever 216 by the shaft 180 of the at least one slave cartridge 175.

In some embodiments, the hose channel 174 exists between an internal surface of the at least one leg 120 and an external surface of the leg sections 121,122 or 123. In other embodiments, the hose channel 174 is provided between the two different sections of leg sections 121,122 and 123. In one embodiment, the at least one slave cartridge 175 includes at least one piston port, further defined as a first piston port 195 and a second piston port 200. The first piston port 195 and the second piston port 200 are in fluid connection with the at least one cylinder port 150 and directly alter movement of a slave piston (not shown) within each of the at least one slave cartridge 175. The first piston port 195 allows for hydraulic fluid to enter the at least one slave cartridge 175. Similarly, the second piston port 200 allows for hydraulic fluid to exit the at least one slave cartridge 175. In some embodiments, the first piston port 195 and the second piston port 200 are non-existent or closed when the at least one slave cartridge 175 is the last slave cartridge in series. In one embodiment, the hose 280 is adjoined to the at least one cylinder port 150 and the at least one piston port. In some embodiments, a plurality of piston ports or more than two piston ports is adjoined to the at least one slave cartridges 175. In some embodiments, a plurality of mounting protrusions 205 is adjoined to the at least one slave cartridges 175 and extend away from the at least one slave cartridge 175. The plurality of mounting protrusions 205 aiding in securing the at least one slave cartridge 175 within the hose channel 174.

As shown in FIGS. 7-13, the at least one slave cartridge 175 comprises a front side 180 and a rear side 185. The rear side 185 includes a guide 181 adjoined thereto to contact leg sections 121,122, or 123. Upon the rear side of the at least one slave cartridges 175, a second button opening 191 protrudes into the at least one slave cartridge 175 and is configured to retain the at least one locking button 170,171, and 172 within. In one embodiment, the second button opening 191 has approximately the same cross-sectional shape as the button.

Within the second button opening 191, a button alignment member 190 is adjoined to the at least one slave cartridge 175 and extends substantially perpendicular to the second button opening 191. In one embodiment, the button alignment member 190 comprises a cylindrical protrusion extending away from the rear side 185 of the at least one slave cartridge 175 and is designed to hold the at least one button spring 221. In some embodiments, the at least one button spring 221 or the at least one lever spring 220 may comprise a conical spring, an extension spring, a compression spring, a torsional spring, or any other spring known to one skilled in the art.

Further, in some embodiments, the at least one leg 120 or the leg sections 121,122 or 123 may further comprise at least one leg coupling. In some embodiments, the at least one leg coupling includes a first leg coupling 130, a second leg coupling 131, and a third leg coupling 132. The at least one leg coupling serving to aid in assembly of the at least one leg 120 or the sections 121,122 or 123. In one embodiment, the at least one locking button 170,171, and 172 includes a first locking button 170, a second locking button 171, and a third locking button 17, wherein the locking buttons are arranged within the first button opening 192 of the first leg coupling 130, the second leg coupling 131, and the third leg coupling 132, respectively. In some embodiments, each leg couplings 130,131, or 132 are adjoined to the distal end of each of the at least one leg 120, wherein the at least one slave cartridges 175 is disposed within and adjoined to the leg couplings 130,131, or 132. In other embodiments, the at least one leg coupling is adjoined to the distal end of the leg sections 121,122, or 123.

Figure 14:
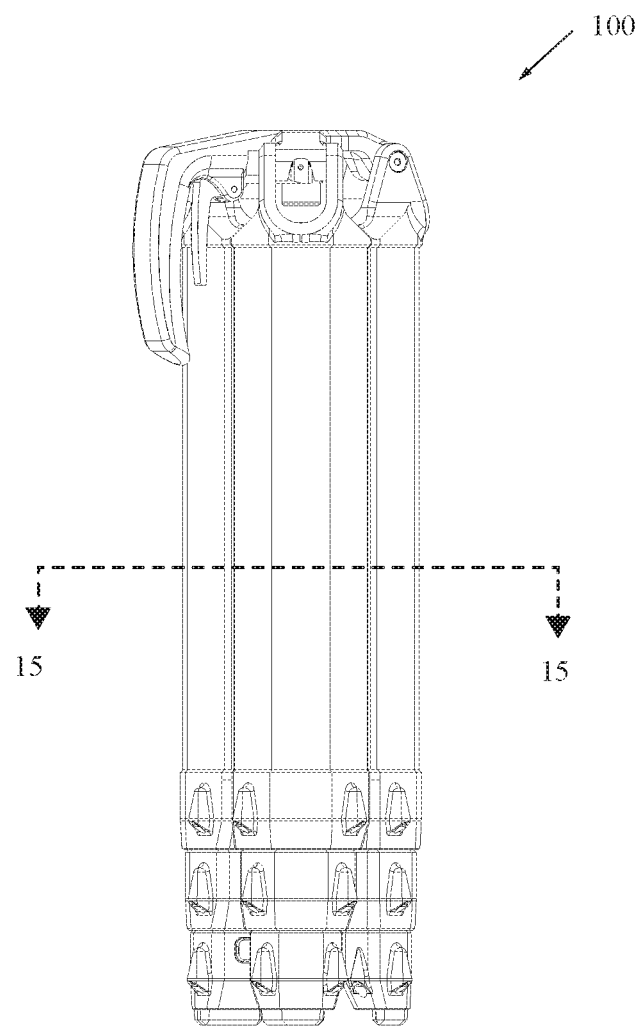
FIG. 14 shows an exemplary side view of one embodiment of the hydraulic tripod 100 and section line 15-15.
Figure 15:
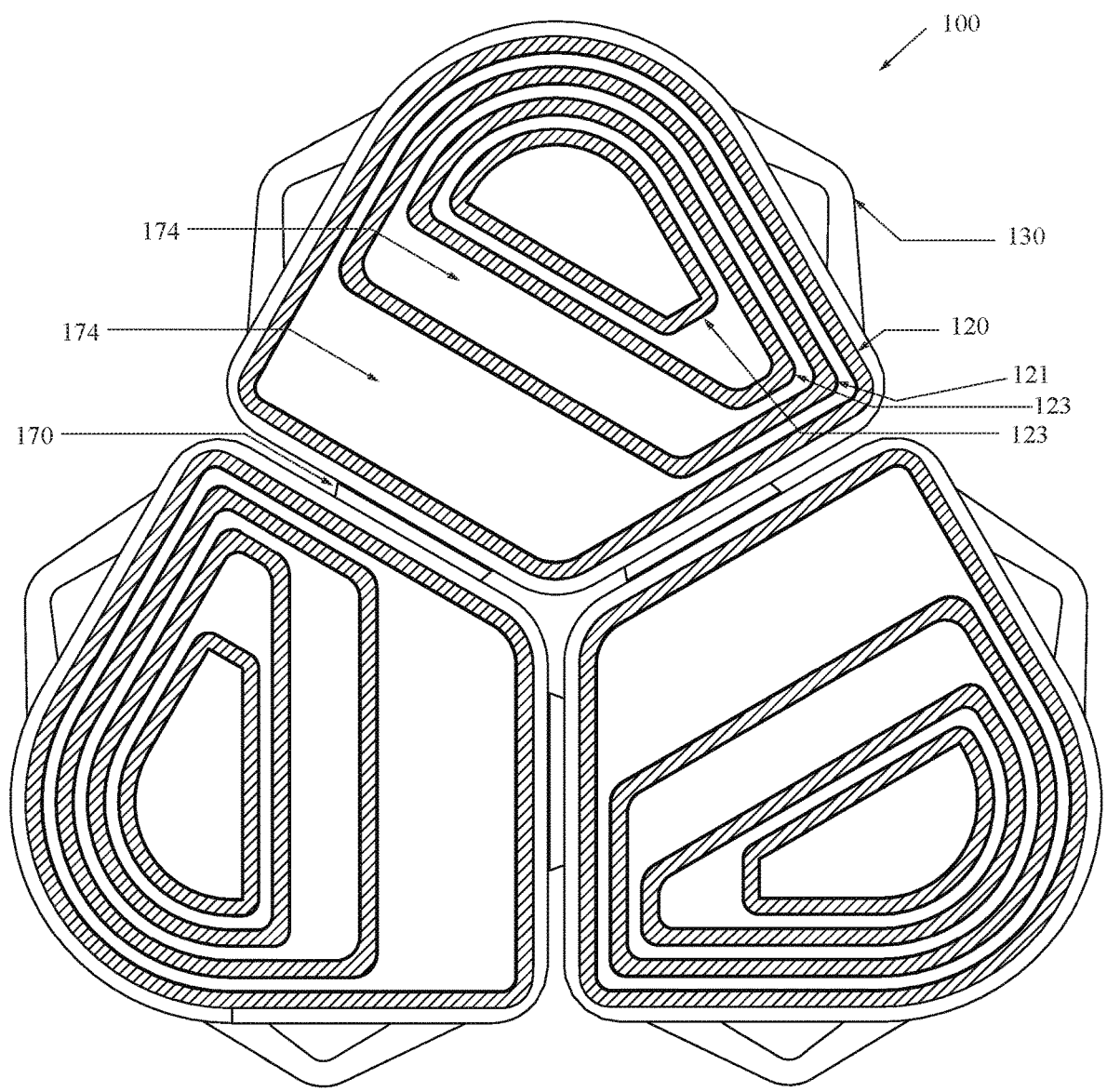
FIG. 15 shows an exemplary cross-sectional view of one embodiment of the hydraulic tripod 100 taken along section line 15-15 in FIG. 14.

FIGS. 14-15 illustrate a cross-sectional view taken along section line 15-15 in FIG. 14. In this exemplary embodiment, the at least one leg 120 is shown with the sections 121,122, and 123 positioned within. The hose channel 174 is clearly illustrated existing between the predetermined offset of the central leg axis A1 and the central leg section axis B1, as shown in FIG. 6. The cross-sectional shape of the at least one leg 120, the at least one locking button 170,171, and 172 or the at least one leg section 121 can be at least one shape of a shape set consisting of: a honeycomb shape, a square, a circle, a triangle, a rectangle, an octagon, a shape having at least one flat side, and an oval.

Figure 16:
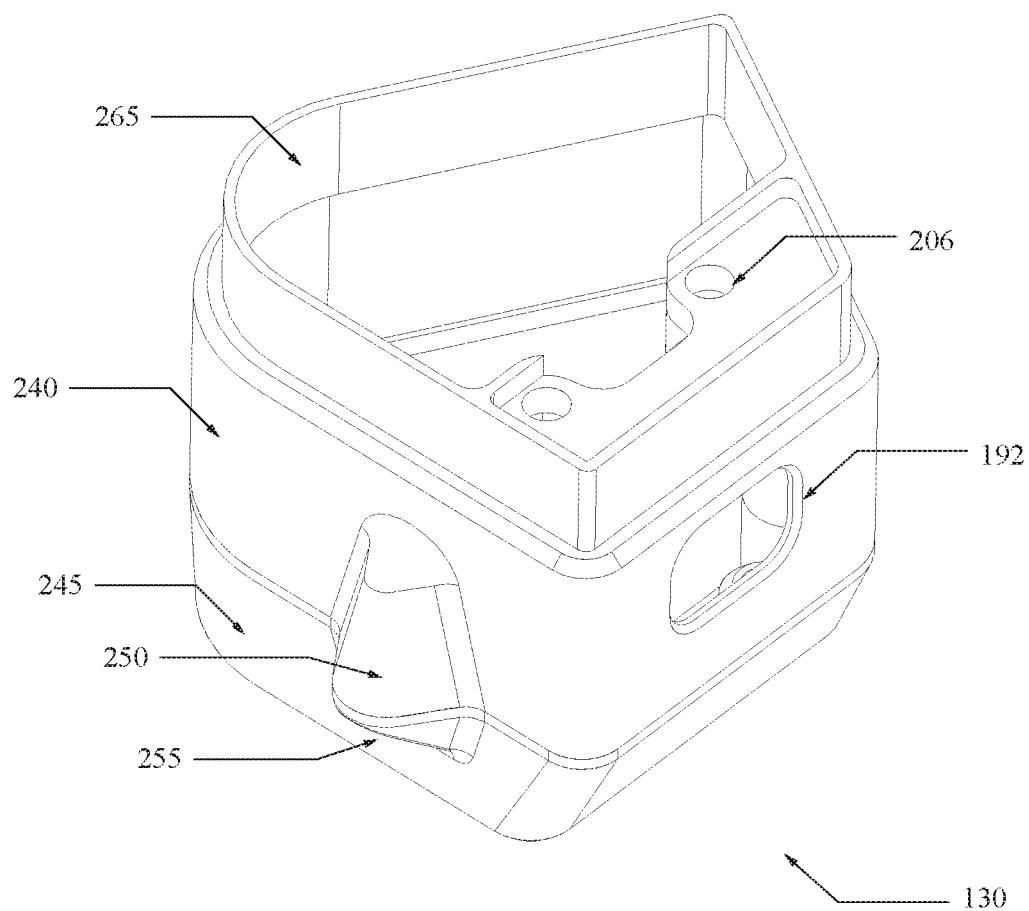
FIG. 16 shows an exemplary perspective view of one embodiment of a leg coupling of the hydraulic tripod.
Figure 17A:
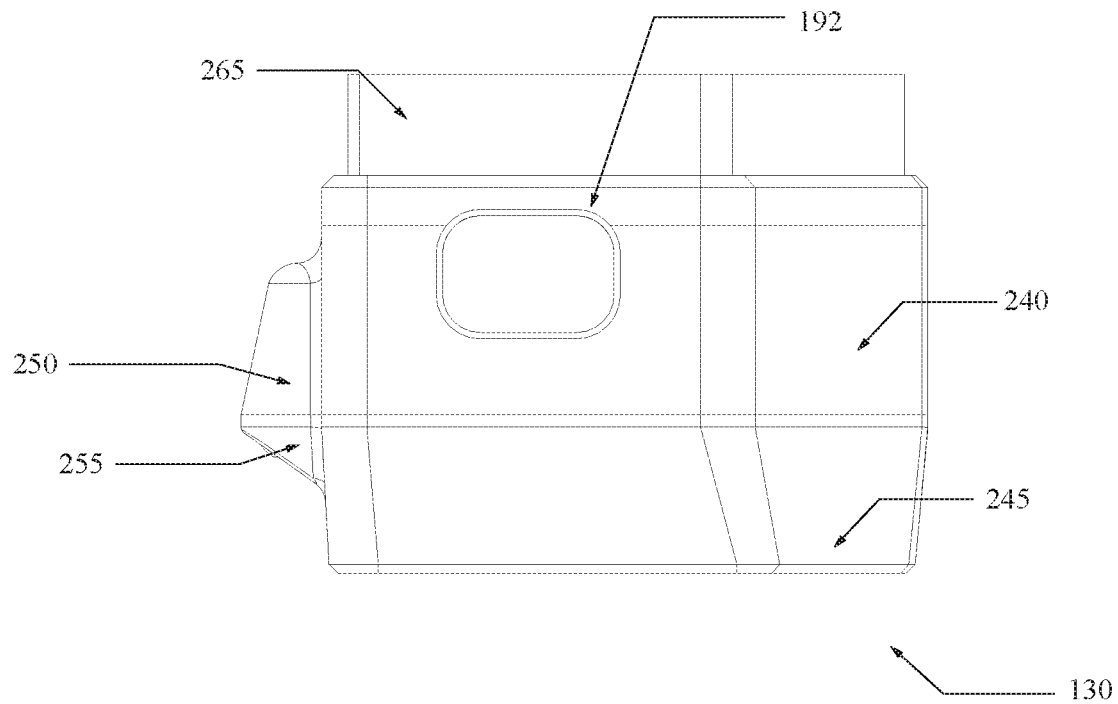
FIG. 17A shows an exemplary side view of one embodiment of a leg coupling of the hydraulic tripod.
Figure 17B:
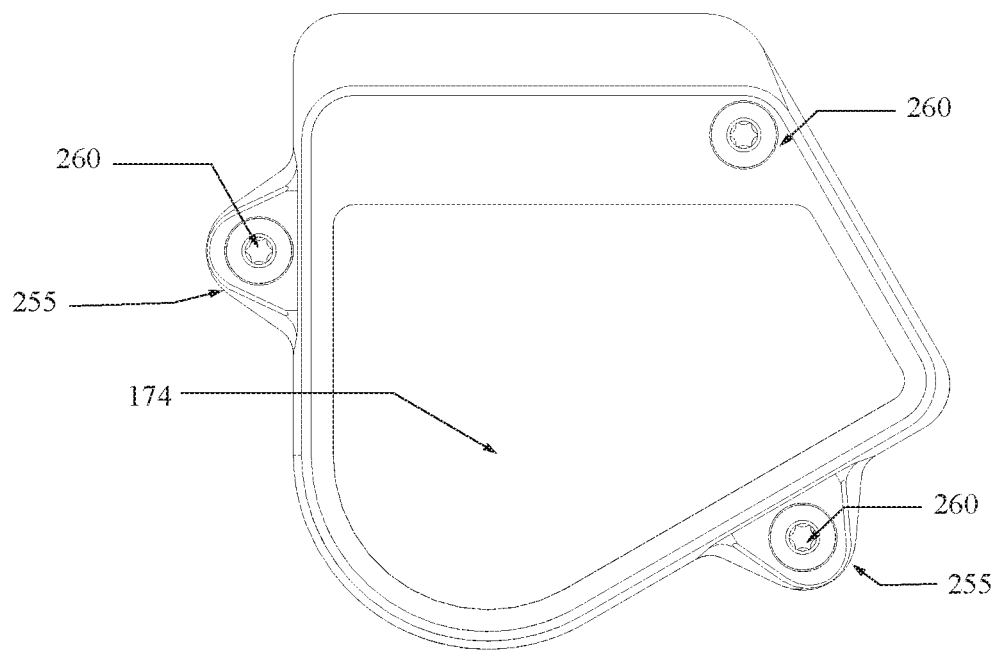
FIG. 17B shows an exemplary bottom view of one embodiment of a leg coupling of the hydraulic tripod.

In some embodiments, as shown in FIGS. 16,17A and 17B, the first button opening 192 is shown extending through each of the leg couplings 130,131, or 132. In one embodiment, the first button opening 192 has approximately the same cross-sectional shape as the at least one locking button 170,171, and 172. In other embodiments, having no leg couplings 130,131 or 132, the at least one leg 120 or the leg sections 121,122 or 123 may comprise the first button opening 192. The couplings 130,131, or 132 may require further linear alignment during assembly. To facilitate this linear alignment, a perimeter protrusion 265 may be adjoined to a top surface of the leg couplings 130,131, or 132. The perimeter protrusion 265 is configured to slide into and adjoin to the internal surface of the at least one leg 120 or the leg sections 121,122 or 123. In some embodiments, the leg couplings 130,131, or 132 further comprises a top member 240 and a bottom member 245 to aid in the assembly of the hydraulic tripod 100. The top member 240 is adjoined permanently or temporarily to the bottom member 245 by at least one member of an attachment set, as defined below. In another embodiment, the top member 240 is adjoined to the bottom member 245 by at least one coupling fastener 260 secured within an upper external receptacle 250 and a lower external receptacle 255. In the current embodiment, the upper external receptacle is adjoined to the top member 240 and the lower external receptacle 255 is adjoined to the bottom member 245.

As shown in FIGS. 16,17A and 17B the plurality of mounting protrusions 205 are inserted within a plurality of mounting apertures 206. The top member 240 and the bottom member 245 of the couplings 130,131, or 132 may include the plurality of mounting apertures 206 adjoined thereto. The plurality of mounting apertures 206 designed to receive the plurality of mounting protrusions 205. In the exemplary assembly, the at least one slave cartridge 175 may be assembled and held in place between the top member 240 and the bottom member 245.

Figure 13:
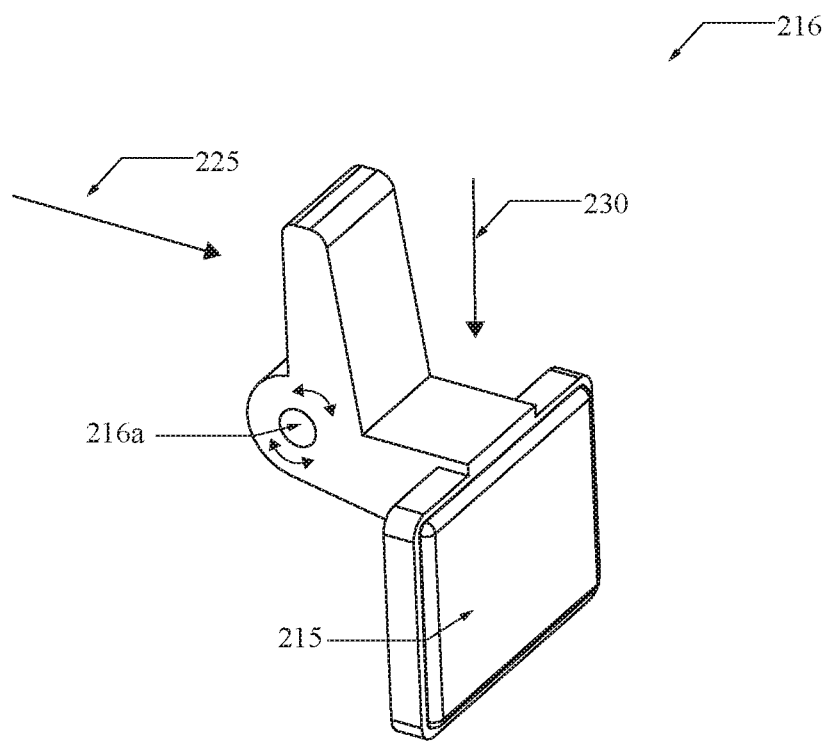
FIG. 13 shows an exemplary perspective view of one embodiment of a input device 115 of a slave cartridge of the hydraulic tripod.

In one embodiment, in a first mode of operation, the shaft 180 of the at least one slave cartridge 175 rotates the lever 216 in a first direction 230 (as shown in FIG. 13) when the input device 115 is manually engaged. The result is an inward rotation about a lever axis 216a of the lever 216. The inward rotation resulting in movement of the at least one brake pad 215 away from the at least one leg section 121,122 or 123. Similarly, in a second mode of operation the at least one locking button 170,171 and 172 is manually engaged by the user in a second direction 225. The result is also an inward rotation about the lever axis 216a of the lever 216 away from the at least one leg section 121,122 or 123. As a consequence of an inward rotation, the at least one brake pad 215 is translated away from the at least one leg section 121,122 or 123, allowing the leg sections 121,122 or 123 to move freely in a linear direction parallel to both the central leg axis A1 and the central leg section axis B1. When the shaft 180 disengages the lever 216, the at least one lever spring 220 moves the lever 216 and the at least one brake pad 215 by rotating both in an outward direction back to the original resting position in contact with the leg sections 121,122 or 123. Similarly, when the at least one locking button 170,171 and 172 is no longer manually engaged by the user, a button spring (not shown) moves the at least one locking button 170,171 and 172 in an outward direction back to the original resting position. As a result, the lever 216 is not obstructed by the at least one locking button 170,171 and 172, and the at least one brake pad 215 is rotated in an outward direction back to the original resting position in contact with the at least one leg section 121,122 or 123.

Figure 18:
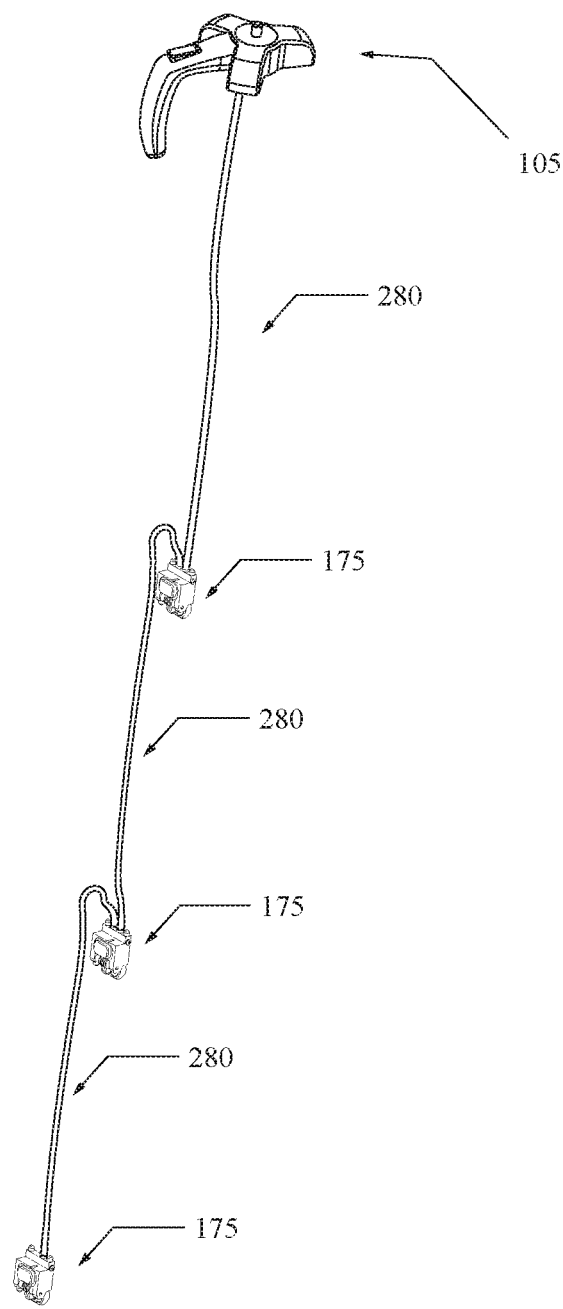
FIG. 18 shows an exemplary perspective view of one embodiment of a hose and the at least one slave cartridges of the hydraulic tripod.

As shown in FIG. 18, an exemplary routing configuration of the hose 280 to the at least one slave cartridge 175 is shown with other components of the hydraulic tripod 100 hidden from view. In one embodiment, the hose 280 facilitates a fluid connection between the at least one hydraulic cylinder 140 to each of the at least one slave cartridges 175 in a descending order and in series, terminating with one of the at least one slave cartridges 175 at the distal end of the second leg section 122. In one embodiment, each leg section of the at least one leg sections 121, 122, and 123 of the hydraulic tripod 100 is released from the at least one brake pads in sequential order from top to bottom. In other embodiments, the hose may be routed in parallel from a manifold adjoined to the at least one hydraulic cylinder 140.

In some embodiments, the at least one hydraulic cylinder 140 is at least one member of a hydraulic cylinder set: a single-acting cylinder, a double-acting cylinder, a non-differential cylinder, a telescoping cylinder, a welded rod hydraulic cylinder, and a tie-rod hydraulic cylinder. In some embodiments, the input device 115 may comprise a pressurized reservoir aiding in actuation and manipulation of the at least one slave cartridges 175 and/or the characteristic of the at least one hydraulic cylinder 140. Other configurations of the hydraulic tripod 100 can include a leg brace (not shown), wherein the leg brace is adjoined to the head member 105 and each of the at least one leg 120. In some embodiments, the at least one leg section 121,122, or 123 further comprise a leg cap 125 adjoined to the bottom of the leg section. The leg cap 125 aiding in securing the hydraulic tripod 100 to the ground upon which the hydraulic tripod 100 rests.

In other embodiments, at least one valve (not shown) may be adjoined to the at least one hydraulic cylinder 140, the input device 115, the at least one slave cartridges 175, or at any location upon the length of the hose 280. The at least one valve aiding in assembly, deployment or retraction of the hydraulic tripod 100. For example, the at least one valve aiding in directional flow, pressure regulation, initiation of deployment of the at least one leg section 121, movement of the input device 115, movement of the lever 216, or movement of the at least one brake pad 215. By way of non-limiting example, the at least one valve is at least one member of a valve set consisting of: a pressure regulating valve, a flow control valve, a directional control valves, a pilot operated valve, a selector valve, a metering valve, a manually operated valve, an electrically actuated valve, a servo-controlled valve, and a manifold.

In some embodiments, the hose 280 facilitates the fluid connection between the at least one hydraulic cylinder 140 and the at least one slave cartridge 175, which can further comprise multiple material layers. In an exemplary manner, the hose of the hydraulic tripod 100 includes an inner tube that carries the fluid, a reinforcement layer, and a protective outer layer. By way of non-limiting example, the hose may be constructed of a hose material set consisting of: an elastomeric material, a rubber material, a fluoropolymer material, a thermoplastic material, a metal material, or any other material known to one skilled in the art of hydraulic design.

In some embodiments, the hose 280 may further be adjoined to the at least one cylinder port 150, the input device 115, the bracket port 165, and the at least one piston port by at least one member of an attachment set consisting of: a threaded connection, a push fitting, a snap fitting, a push-to-connect, a fastener, an adhesive, a weld, a chemical weld, a clamp, a spring, and a rivet. In other embodiments the article attachment member 155 of the head member 105 may comprise at least one member of the attachment set.

In some embodiments, the handle 110 is configured to engage at least one finger of the human hand of the user. In this embodiment, the hydraulic tripod 100, the leg cap 125, or the handle 110 specifically may further comprise an external texture to grip the human hand of the human user. The external texture further comprises at least one member of a texture set consisting of: indentations, extrusions, knurling, a rough surface, and bumps. For example, the handle 110 of the head member 105 of the hydraulic tripod 100 may further comprise the external texture having extrusions for aiding the user in manipulating the input device 115.

Advantageously, precise braking at predetermined points in time desired by the user is directly driven by the movement of the brake pad in addition to the material the at least one brake pad 215 is made of. The initiation, stopping, or manipulation of deployment of the at least one leg section 121 can be altered by the material chosen to control the brake. In exemplary configurations, the at least one brake pad 215 is made of at least one material selected from a brake material set consisting of: a rubber, a plastic, a wood, a cork, a fabric, a neoprene, a ceramic material, a glass material, a semi-metallic material, a plant-based material, and a composite material.

In repetitive use, the hydraulic tripod 100 may further comprise a guide 181 adjoined to the front side 180 of the at least one slave cartridges 175. The guide 181 may be constructed from at least one material of a guide material set consisting of: a ceramic material, a metal material, a plastic material, a composite material, a thermoset plastic, a thermoplastic, a glass material, and a nylon material. Exemplary materials of the guide material set include, by way of non-limiting example, the following materials: an iron-copper material, a bronze material, a leaded bronze material, an aluminum-bronze material, an iron-copper material, a nylon plastic, a UHMW plastic, an acetal plastic, a PTFE plastic, a Rulon plastic, a Rulon J plastic, a Rulon LR plastic, a PEEK plastic, a vespel polyimide plastic, a frelon plastic, and any other material known to one skilled in the art to provide protection against respective wear. The guide 181 aiding in linear movement of the at least one leg sections 121,122 and 123 substantially parallel to the central leg section axis B1.

In exemplary embodiments, the hydraulic tripod 100 may be made of at least one material of an assembly material set consisting of: a metal material, a composite material, a ceramic material, a cast iron material, a stainless-steel material, a fiberglass material, a carbon fiber material, and a plastic material.

In an exemplary configuration requiring further sealing means, the at least one hydraulic cylinder 140, the at least one access port 160, the at least one cylinder port 150, the bracket port 165, the at least one piston port, and the at least one slave cartridges 175 can further comprise at least one member of a seal set consisting of: a gasket, a gland, and a O-ring. Any member of the seal set may be made of at least one exemplary material of a seal material set consisting of: a rubber material, a composite material, a rubber material, a non-rigid material, a foam material, a cork material, a silicone material, a fabric material, a neoprene material, a polytetrafluoroethylene material, and a plastic polymer material. Other embodiments may comprise a wiper gland adjoined to the at least one leg 120, the at least one leg couplings 130, or the at least one leg section 121 for cleaning the exterior surface of the at least one leg section 121 during deployment and retraction. The wiper gland may also be made of at least one material of the seal material set.

The hydraulic tripod 100 can also include at least one member of an identification set consisting of: an alphanumeric identification, a human user's name, a symbolic shape, a company brand, a numeric identification number, a QR code, a barcode, and an RFID tag. For example, the head member 105 may further comprise an RFID tag to pair with the article adjoined thereto.

As used in this application, the term "a" or "an" means "at least one" or "one or more." As used herein, the singular forms "a," "an," and "the" include plural references unless the context clearly dictates otherwise. Any reference to "or" herein is intended to encompass "and/or" unless otherwise stated.

As used in this application, the term "about" or "approximately" refers to a range of values within plus or minus 10% of the specified number. As used herein, the term "about" refers to an amount that is near the stated amount by about 0%, 5%, or 10%, including increments therein. As used in this application, the term "substantially" means that the actual value is within about 10% of the actual desired value, particularly within about 5% of the actual desired value and especially within about 1% of the actual desired value of any variable, element or limit set forth herein.

All references throughout this application, for example patent documents including issued or granted patents or equivalents, patent application publications, and non-patent literature documents or other source material, are hereby incorporated by reference herein in their entireties, as though individually incorporated by reference, to the extent each reference is at least partially not inconsistent with the disclosure in the present application (for example, a reference that is partially inconsistent is incorporated by reference except for the partially inconsistent portion of the reference).

Unless otherwise defined, all technical terms used herein have the same meaning as commonly understood by one of ordinary skill in the art to which this disclosure belongs.

Any element in a claim that does not explicitly state "means for" performing a specified function, or "step for" performing a specified function, is not to be interpreted as a "means" or "step" clause as specified in 35 U.S.C. § 112, ¶6. In particular, any use of "step of" in the claims is not intended to invoke the provision of 35 U.S.C. § 112, ¶6.

Persons of ordinary skill in the art may appreciate that numerous design configurations may be possible to enjoy the functional benefits of the inventive systems. Thus, given the wide variety of configurations and arrangements of embodiments of the present invention the scope of the invention is reflected by the breadth of the claims below rather than narrowed by the embodiments described above.

What is claimed is:

1. A hydraulic tripod comprising:
a head member having an article attachment member;
at least one hydraulic cylinder having an internal volume and at least one cylinder port extending through the at least one hydraulic cylinder, wherein the at least one cylinder port allows access to the internal volume;
an input device adjoined to the head member and in connection with the at least one hydraulic cylinder,
at least one leg having a leg proximal end, a leg distal end, and a central leg axis extending a length of the at least one leg, wherein the at least one leg is hingedly adjoined to the head member;
at least one leg section arranged within the at least one leg, the at least one leg section having a section proximal end, a section distal end, and a central leg section axis extending a length of the at least one leg section, wherein the central leg section axis is offset from the central leg axis;
a hose channel existing between an internal surface of the at least one leg and an external surface of the at least one leg section;
at least one slave cartridge having at least one piston port in fluid connection with the at least one cylinder port;
a hose adjoined to the at least one cylinder port and the at least one piston port;
at least one brake pad attached to the at least one slave cartridge; and,
a first mode of operation configured to enable a user to manually engage the input device to manipulate a characteristic of the at least one hydraulic cylinder in fluid connection to the at least one slave cartridge thereby moving the at least one brake pad away from the at least one leg section.

2. The hydraulic tripod of claim 1, further comprising:
a lever rotationally adjoined to the at least one slave cartridge, wherein the at least one brake pad is adjoined to the lever; and,
at least one spring configured to engage the lever.

3. The hydraulic tripod of claim 2, further comprising:
at least one leg coupling is adjoined to the leg distal end of the at least one leg, wherein the at least one slave cartridge is disposed within the at least one leg coupling;
at least one button opening extending through the at least one leg coupling;
at least one locking button arranged within the at least one button opening; and,
a second mode of operation configured to enable the user to manually engage the at least one locking button thereby moving the at least one brake pad away from the at least one leg section.

4. The hydraulic tripod of claim 3, wherein the at least one slave cartridge rotates the lever in a first direction and the at least one locking button rotates the lever is a second direction.

5. The hydraulic tripod of claim 3, wherein the at least one leg section of the at least one leg is sequentially released from the at least one brake pad when a predetermined spring force of the at least one spring is overcome by the at least one slave cartridge.

6. The hydraulic tripod of claim 2, wherein the hydraulic tripod further comprises an external texture to grip a hand of the user.

7. The hydraulic tripod of claim 6, wherein the external texture further comprises at least one member of a texture set consisting of: indentations, extrusions, knurling, a rough surface, and bumps.

8. The hydraulic tripod of claim 1, wherein the head member further comprises a handle adjoined to the head member, wherein the handle is configured to engage at least one finger of the user.

9. The hydraulic tripod of claim 1, wherein the characteristic of the at least one hydraulic cylinder includes at least one member of a characteristic set consisting of: a pressure of the internal volume, a directional flow of the at least one cylinder port, and a flowrate of the at least one cylinder port.

10. The hydraulic tripod of claim 1, wherein the at least one hydraulic cylinder is at least one member of a hydraulic cylinder set: a single-acting cylinder, a double-acting cylinder, a non-differential cylinder, a telescoping cylinder, a welded rod hydraulic cylinder, and a tie-rod hydraulic cylinder.

11. The hydraulic tripod of claim 1, further comprising a leg brace, wherein the leg brace is adjoined to the head member and the at least one leg.

12. The hydraulic tripod of claim 1, wherein the at least one hydraulic cylinder further comprises at least one member of a valve set consisting of: a pressure control valve, a flow control valve, and a directional control valves, a directly operated valve, a pilot operated valve, a manually operated valve, an electrically actuated valve, an open control valve, a servo controlled valve, and a manifold.

13. The hydraulic tripod of claim 1, wherein the at least one hydraulic cylinder, the at least one cylinder port, the at least one piston port, and the at least one slave cartridge further comprises at least one member of a sealing set consisting of: a gasket, a gland, and a O-ring.

14. The hydraulic tripod of claim 1, wherein the hose is adjoined to the at least one cylinder port and the at least one piston port by at least one attachment member selected from the group consisting of: a threaded connection, a push fitting, a snap fitting, a push-to-connect, a fastener, an adhesive, a weld, a chemical weld, a clamp, a spring, and a rivet.

15. The hydraulic tripod of claim 1, wherein the input device is at least one input member selected from the group consisting of: a lever, a trigger, a pressurized reservoir, a mechanical pump, an electrical pump, a motor, and a foot pedal.

16. The hydraulic tripod of claim 1, wherein the hydraulic tripod further comprises at least one identification member selected from the group consisting of an alphanumeric identification, a human user's name, a symbolic shape, a company brand, a numeric identification number, a QR code, a barcode, and an RFID tag.

17. The hydraulic tripod of claim 1, wherein the at least one brake pad is made of at least one brake material selected from the group consisting of: a rubber, a plastic, a wood, a cork, a fabric, a neoprene, a ceramic material, a glass material, a semi-metallic material, a plant-based material, and a composite material.

* * * * *